UNITED STATES PATENT OFFICE.

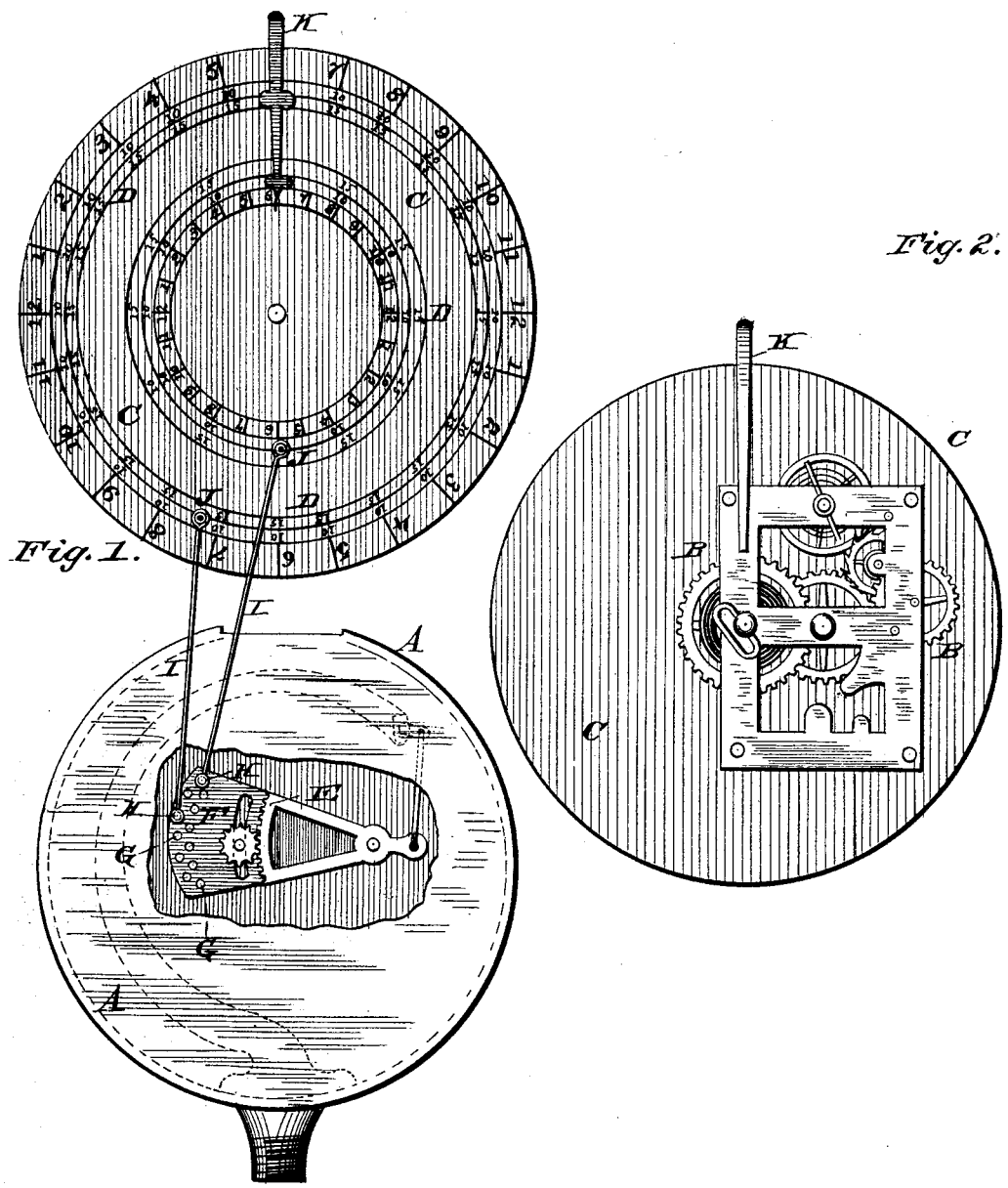

HARRIS BERNSTEIN, OF TITUSVILLE, PENNSYLVANIA.

RECORDING PRESSURE-GAGE.

SPECIFICATION forming part of Letters Patent No. 268,383, dated December 5, 1882.

Application filed March 16, 1882. (No model.)

*To all whom it may concern:*

Be it known that I, HARRIS BERNSTEIN, of Titusville, in the county of Crawford, and State of Pennsylvania, have invented certain new and useful Improvements in Pressure-Gages; and I do hereby declare that the following is a full, clear, and exact description of the invention, which will enable others skilled in the art to which it appertains to make and use the same, reference being had to the accompanying drawings, which form a part of this specification.

Figure 1 is a front view, showing my improved recording apparatus attached to a steam-gage; and Fig. 2 is a rear view of the same.

Similar letters of reference indicate corresponding parts in both figures.

This invention relates to devices for registering and recording the pressure in steam and fluid gages of all kinds; and it consists in certain improvements in the construction of the same, which will be hereinafter fully shown and specified, and particularly pointed out in the claim.

My invention embodies in its construction a clock-work, a dial attached to the same and adapted to revolve once in twenty-four hours, (or once in twelve hours, or any other period that may be preferred,) said dial being provided with radial lines indicating time, and circular concentric lines indicating pressure, a stationary finger or pointer by which the time may be read, and one or more markers attached to the rack of the gage or to a suitably-arranged separate rack, and so constructed and arranged as to register upon the revolving dial the pressure in all its variations, thus recording not only the varying pressures, but also the exact time at which the changes took place and how long they lasted.

The gage, which in the drawings is represented by letter A, may be of any suitable construction; likewise the clock-work B, which may be attached to the casing of the gage or in any suitable position.

C is the dial, which is suitably connected to the clock-work and adapted to revolve, say, once in twenty-four hours. The edge of the dial has figures indicating time, and these figures may, for convenience in reading, be printed in different colors for the hours of day and night—say black for day and red for night. The dial is also provided with a series of concentric circular lines, D, indicating different degrees of pressure, and marked with figures to correspond.

To the rack E of the gage A is attached a segmental plate, F, having a series of perforations, G, adapted to receive a set-screw or set-screws, H, by which the rods or wires I may be attached to said plate. At their outer ends the rods or wires I carry pencils or suitably-constructed markers J, adapted to trace marks upon the face of the dial, with which the points of said markers are in contact. By properly adjusting the carrying-rods or wires, the markers may at the start be made to register with any of the concentric pressure-indicating circles upon the face of the dial.

K is a stationary hand or pointer, by which the time may be read upon the face of the dial.

The dial may be coated with some suitable compound enabling the traces left by the markers to be washed off, when desired, or the figures, &c., referred to may be printed upon separate sheets adapted to be secured detachably upon the disk constituting the dial.

From the foregoing description, taken in connection with the drawings hereto annexed, the operation and advantages of my invention will be readily understood.

As the pressure changes the markers J are raised or lowered, as the case may be, thus indicating upon the revolving dial the hour and extent of such change.

The recording device may be so arranged as to be safe from injury in case of a boiler explosion or similar accident, thus proving conclusively when such accident has been caused by mismanagement or neglect.

A suitable moving belt may be substituted for the dial without changing my invention.

Having thus described my invention, I claim and desire to secure by Letters Patent of the United States—

In a recording device, constructed substantially as described, the segmental plate F, attached to the rack of the gage and having perforations G, in combination with the set-screws H and wires I, carrying markers J, substantially as and for the purpose set forth.

In testimony that I claim the foregoing as my own I have hereto affixed my signature in presence of two witnesses.

HARRIS BERNSTEIN.

Witnesses:
P. J. MEISING,
JOS. HOENIG.